United States Patent [19]

Eilliott et al.

[11] Patent Number: 4,874,728
[45] Date of Patent: Oct. 17, 1989

[54] ORGANOPHILIC CLAY MODIFIED WITH SILANE COMPOUNDS

[75] Inventors: Donald R. Eilliott, Louisville; Gary W. Beall, Fairfield, both of Ky.

[73] Assignee: United Catalyst Inc., Louisville, Ky.

[21] Appl. No.: 171,424

[22] Filed: Mar. 21, 1988

Related U.S. Application Data

[63] Continuation-in-part of Ser. No. 50,473, Mar. 26, 1987, abandoned, which is a continuation-in-part of Ser. No. 796,867, Nov. 12, 1985, abandoned.

[51] Int. Cl.$^4$ .............................................. C04B 33/04
[52] U.S. Cl. .................................... 501/148; 501/141; 501/145; 501/146
[58] Field of Search ............... 501/148, 149, 141, 145, 501/146; 252/315.1, 315.2, 8.514, 8.551

[56] References Cited

U.S. PATENT DOCUMENTS 4,558,075  12/1985  Suss ............................... 524/447 X
4,620,993  11/1986  Suss ............................... 427/407.1

Primary Examiner—William R. Dixon, Jr.
Assistant Examiner—James M. Hunter, Jr.
Attorney, Agent, or Firm—Hebert P. Price

[57] ABSTRACT

Organophilic clays useful for modifying the rheological properties of organic fluids are made from a smectite type clay, a quaternary ammonium compound and an organosilane.

14 Claims, No Drawings

ORGANOPHILIC CLAY MODIFIED WITH SILANE COMPOUNDS

CROSS REFERENCE TO RELATED APPLICATIONS

This is a continuation-in-part of application, Ser. No. 50,473, filed Mar. 26, 1987 now abandoned which is a continuation-in-part of application, Ser. No. 796,867 filed Nov. 12, 1985 now abandoned.

BACKGROUND OF THE INVENTION

The field of art to which this invention pertains is organophilic modified clays.

Organophilic clays which are compatible with organic liquids have been known for some time. Their preparation and various uses have been described in, for example, U.S. Pat. No. 2,531,427 and U.S. Pat. No. 2,966,506. As taught by these references, naturally occurring water dispersible clays, such as montmorillonite, are reacted with "onium" compounds to produce organic clay complexes which are compatible with organic liquids.

In order to obtain maximum dispersibility and maximum thickening or gelling efficiency using organophilic clays, it has been necessary to add a low molecular weight polar organic compound to the composition. Such polar organic compounds have been called polar activators dispersants, dispersion aids, solvating agents, and the like. Methanol is an example of a useful polar compound.

Organophilic clays which are said to have enhanced dispersibility in organic systems without using a polar activator are described in U.S. Pat. No. 4,105,578. Such organophilic clays are made from the reaction of smectite-type clays with a methyl benzyl dialkyl ammonium compound wherein the alkyl groups contain at least 16 carbon atoms.

Other organophilic clays having enhanced dispersibility in organic systems are described in U.S. Pat. No. 4,412,018. These compositions are made by reacting a smectite-type clay with an organic anion, such as an organic acid, and an organic cation, such as a quaternary ammonium compound.

Additional organophilic clays are described in U.S. Pat. Nos. 4,434,075, 4,434,076, and 4,450,095.

SUMMARY OF THE INVENTION

This invention is directed to easily dispersible organophilic clays made by modifying a smectite-type clay with a quaternary ammonium compound and an organosilane.

The compositions of this invention are the reaction products of a smectite type clay having a cation exchange capacity of at least about 75 milliequivalents per 100 grams of clay and (A) a quanternary ammonium compound having the structure:

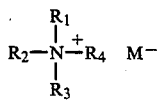

wherein $R_1$ is an alkyl group having about 12 to about 22 carbon atoms, wherein $R_2$, $R_3$ and $R_4$ are alkyl groups containing 1 to about 22 carbon atoms, aryl groups and arylalkyl groups containing 7 to about 22 carbon atoms and wherein M is chloride, bromide, iodide, nitrite, hydroxide, nitrate, sulfate or $C_1$ to $C_{18}$ carboxylate, further modified with (B) an organosilane compound having the structure:

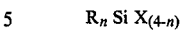

wherein n is an integer of 1 to 3, wherein R is an organic radical having a carbon atom directly linked to the silicon atom and wherein X is alkoxy, acryloxy, amino or halogen. The organic radical contains from 1 to about 20 carbon atoms and can be alkyl, aryl, alkaryl, arylalkyl, vinyl, allyl, aminoalkyl, aminoaryl, and organic radicals which contain ether, ketone, ester and carboxyl groups. The compositions of this invention contain about 50 to about 150 milliequivalents (meqs.) of the quaternary ammonium compound (A) and about 0.5 to about 5 weight percent organosilane, said meqs being based on 100 grams of clay (active basis) and said weight percents being based on the weight of the organophilic clay, i.e., the theoretical weight of the reaction product of the clay and the quaternary ammonium compound.

DESCRIPTION OF THE INVENTION

The clays used to prepare the composition of this invention are smectite-type clays which have a cation exchange capacity of at least 75 milliequivalents per 100 grams of clay. Particularly desirable types of clays are the naturally occurring Wyoming varieties of swelling bentonites and like clays, and hectorite, a swelling magnesium-lithium silicate clay.

The clays, especially the bentonite type clays, are preferably converted to the sodium form if they are not already in this form. This can be done by preparing an aqueous clay slurry and passing the slurry through a bed of cation exchange resin in the sodium form. Alternatively, the clay can be mixed with water and a soluble sodium compound, such as sodium carbonate, sodium hyroxide and the like, followed by shearing the mixture with a pug mill or extruder.

The quaternary ammonium compounds used in this invention contain at least one alkyl substituent on the nitrogen atom having at least 12 carbon atoms up to about 22 carbon atoms. The other nitrogen substituents are (a) linear or branched alkyl groups having 1 to about 22 carbon atoms, (b) arylalkyl groups, such as benzyl and substituted benzyl and (c) aryl groups, such as phenyl and substituted phenyl. The quaternary ammonium compounds can be represented by the structural formula:

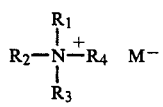

wherein M is an anion, such as chloride, bromide, iodide, nitrite, nitrate, sulfate, hydroxide, $C_1$ to $C_{18}$ carboxylate, and the like, wherein $R_1$ is an alkyl group containing about 12 to about 22 carbon atoms and $R_2$, $R_3$ and $R_4$ are alkyl groups containing 1 to about 22 carbon atoms, arylalkyl groups containing 7 to 22 carbon atoms, aryl groups containing 6 to 22 carbon atoms and mixtures thereof. Preferred quaternary ammonium compounds are those wherein $R_1$ and $R_2$ are alkyl groups having about 12 to about 22 carbon atoms and $R_3$ and $R_4$ are methyl, those wherein $R_1$ is an alkyl groups having about 12 to about 22 carbon atoms, $R_2$ is benzyl, and $R_3$ and $R_4$ are methyl, or mixtures thereof.

The long chain alkyl groups can be derived from naturally occurring vegetable oils, animal oils and fats or petrochemicals. Examples include corn oil, cotton seed oil, coconut oil, soybean oil, castor oil, tallow oil and alpha olefins. A particularly useful long chain alkyl group is derived from hydrogenated tallow.

Other alkyl groups which can be present in the quaternary ammonium compound are such groups as methyl, ethyl, propyl, butyl, hexyl, 2-ethylhexyl, decyl, dodecyl, lauryl, stearyl and the like.

Aryl groups include phenyl and substituted phenyl. Arylalkyl groups include benzyl and substituted benzyl groups.

Example of useful quaternary ammonium compounds are dimethyl di(hydrogenated tallow) ammonium chloride, methyl tri(hydrogenated tallow) ammonium chloride, dimethyl benzyl hydrogenated tallow ammonium chloride, methyl benzyl di(hydrogenated tallow) ammonium chloride and the like. Preferred quaternary ammonium compounds are dimethyl di(hydrogenated tallow) ammonium chloride, dimethyl benzyl hydrogenated tallow ammonium chloride and mixtures thereof wherein the mixtures can contain 99 to 1 meqs of one compound to 1 to 99 meqs of the other compound. A particularly preferred mixture is one which contains equal meqs of each compound.

The organosilane used in this invention has the structure

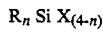

wherein n is an integer of 1 to 3, wherein R is an organic radical having a carbon atom directly linked to the silicon atom and wherein X is alkoxy, acryloxy, amino or halogen having no carbon-silicon linkage. R, the organic radical, contains from 1 to about 20 carbon atoms and can be alkyl, aryl, alkaryl, arylalkyl, vinyl, allyl, aminoalkyl, aminoaryl, and organic radicals which contain ether, ester and carboxyl groups. These organosilanes contain at least one group which is not hydrolyzable, the R group, and at least one group which can be hydrolyzed, the X group.

The organosilanes useful in this invention are those which are primarily used as coupling agents in reinforced plastic manufacture. Such organosilanes are described in "Silane Coupling Agents" by E. P. Plueddemann, Plenum Press, New York (1982) and "Silicon Compounds-Register and Review", Petrarch Systems (1987), both of which are incorporated by reference.

Examples of useful organosilanes include, but are not limited to, methyltrimethoxysilane, ethyltrimethoxysilane, propyltrimethoxysilane, dimethyldimethoxysilane, diethyldimethoxysilane, trimethylmethoxysilane, triethylmethoxysilane, phenyltriethoxysilane, diphenyldiethoxysilane, triphenylethoxysilane, benzyltriethoxysilane, benzyldimethylethoxysilane, 2-acetoxyethyldimethylchlorosilane, 3-acryloxypropyldimethylmethoxysilane, allyltrimethoxysilane, 4-aminobutyltriethoxysilane and the like. A particularly preferred organosilane for use in this invention is phenyltriethoxysilane.

The compositions of this invention contain about 50 to about 150 meqs of the quaternary ammonium compound based on 100 grams of clay on a 100 percent active basis, and, preferably, about 80 to about 130 meqs. The amount of silane reacted in the compositions of this invention is about 0.5 to about 5 weight percent based on the theoretical weight of the reaction product of the clay and the quaternary ammonium compound and, preferably, about 1 to about 2.5 weight percent.

The organophilic clays of this invention can be further modified by the incorporation of hydrogenated castor oil. It has been found that the thixotropic properties of the organophilic clays can be improved by the addition of up to about 25 weight percent hydrogenated castor oil wherein the weight percent is based on the total weight of organophilic clay and hydrogenated castor oil.

In preparing the organophilic clays of this invention, the smectite type clays are slurried in water at a concentration of about 1 to about 10 weight percent. The clay slurry is then filtered and/or centrifuged to remove impurities, such as sand particles. The cleaned slurry has a concentration in water of about 1.5 to about 5 weight percent and is heated to about 40° to about 95° C., preferably about 60° to about 75° C. The quaternary ammonium compound and the organosilane compound, (preferably as an emulsion in water or alcohol,) are added. Agitation and heating are continued for about 15 minutes to about 2 hours to complete the reaction of the compounds with the clay. When the reaction is completed, the excess water is removed and the organophilic clay is dried.

The compositions of this invention can be used as rheological additive in a wide variety of non-aqueous liquid systems. These clays are useful in paints, varnishes, enamels, waxes, adhesives, inks, laminating resins, gel coats and the like. The clays can be incorporated into the non-aqueous liquids using colloid mills, roller mills, ball mills and high speed dispersers.

The compositions of this invention are particularly useful for preparing thixotropic crosslinkable compositions from unsaturated polyesters and unsaturated aromatic monomers. Unsaturated polyester compositions prepared from unsaturated acids or anhydrides and aliphatic diols in admixture with unsaturated monomers, e.g., styrene, are converted to crosslinked thermoset compositions by peroxide cure catalysis. Such compositions are particularly useful in the preparation of glass fiber laminates. Thixotropic agents, such as the organophilic clays of this invention, are added to such polyester composition in order to have workable low viscosities at high shear, such as is developed in mixing and spraying, and high viscosities at low or no shear to prevent flow and drainage of the polyester composition when applied to vertical surfaces.

The compositions of this invention can be used in both the "pregel" and the "direct add" processes. The "pregel" process involves dispersing the organophilic clay in the styrene portion of the thermosetting polyester composition to form a gel. Just prior to use, this gel is then mixed in with the polyester. In the "direct add" process, the organophilic clay is added and dispersed in the solution of polyester and styrene. The organophilic clays of this invention are used with the unsaturated polyester-aromatic monomer compositions in the amount of about 0.5 to about 2 weight percent based on the weight of the polyester composition.

The following examples describe the invention in more detail. Parts and percentages are by weight unless otherwise designated.

EXAMPLE 1

To a suitable container are added two thousand parts of an aqueous slurry of Wyoming bentonite at 1.8 percent solids which had previously been centrifuged to remove non-clay impurities. Agitation is begun and heat is applied raising the temperature to 75° C. To the slurry is added an aqueous emulsion of dimethyl di(hydrogenated tallow) ammonium chloride (DMD) in the amount of 90 milliequivalents (meqs) of the quaternary ammonium salt based on 100 grams of the clay. After mixing for 15 minutes at 75° C., 1 weight percent of phenyltriethoxy-silane is added, said weight percent being based on the theoretical weight of the reaction product of the quaternary ammonium chloride an the clay. After additional heating and mixing at 75° C., the organophilic clay product is recovered by filtration and is dried at 90° C. for 24 hours. The dried product is ground and screened through a 170 mesh (U.S. Standard Sieve) screen.

Additional organophilic clays are made using different milliequivalent amounts of dimethyl di(hydrogenated tallow) ammonium chloride and different amounts of phenyltriethoxy silane. Other clays are made using dimethyl benzyl hydrogenated tallow ammonium chloride (DBT) in place of the DMD quat.

When the organophilic clays are modified with hydrogenated castor oil, the castor oil is blended with the dry organophilic clay. The hydrogenated castor oil (HC) is added in the amount of 25 weight percent based on the weight of the reaction product of the clay, quaternary ammonium salt and the silane.

Table 1 lists the components used to make organophilic clays of this invention. Quat refers to the quaternary ammonium chloride. DBT is dimethyl benzyl hydrogenated tallow ammonium chloride. DMD is dimethyl di(hydrogenated tallow) ammonium chloride. The quat level, i.e., the amount used, is expressed in milliequivalents (meqs). The silane used is phenyltriethoxy silane. The amount used is weight percent based on the theoretical weight of the reaction product of the clay and quat. The organophilic clays also contain 25 weight percent hydrogenated castor oil based on total weight of the organophilic clay product and hydrogenated castor oil.

TABLE 1

| Example | Quat | Quat level | Silane Level |
|---------|------|------------|--------------|
| 1A | DBT | 90 | 0.5 |
| 1B | DBT | 90 | 1.0 |
| 1C | DBT | 90 | 1.5 |
| 1D | DBT | 90 | 2.0 |
| 1E | DBT | 80 | 1.0 |
| 1F | DBT | 90 | 1.0 |
| 1G | DBT | 100 | 1.0 |
| 1H | DBT | 110 | 1.0 |
| 1I | DMD | 80 | 1.0 |
| 1J | DMD | 90 | 1.0 |
| 1K | DMD | 100 | 1.0 |
| 1L | DMD | 110 | 1.0 |

EXAMPLE 2

The organoclays are tested as thixotropic agents for unsaturated polyester compositions by the following procedure:

A pregel is prepared by mixing until completely gelled 23 parts of styrene and 2 parts of organoclay. This pregel is then combined with 177 parts of unsaturated polyester and styrene containing 67 weight percent polyester. The mixture is stirred at 2000 RPM for 15 minutes. The viscosity using a Brookfield viscometer is determined at different RPM's at one hour, 24 hours and 1 week. The viscosity data are listed in Table 2. Percentages where listed indicate the amount of settling i.e., the ratio of settled clay to liquid height.

TABLE 2

| Time | RPM | A | B | C | D | E | F |
|------|-----|---|---|---|---|---|---|
| 1 hr | 2.5 | 832 | 904 | 836 | 764 | 212 | 752 |
| 1 hr | 5 | 524 | 574 | 560 | 508 | 194 | 504 |
| 1 hr | 20 | 242 | 259 | 282 | 253 | 145 | 256 |
| 1 hr | 50 | 171 | 182 | 187 | 188 | 134 | 192 |
| 24 hrs | 2.5 | 88% | 1160 | 90% | 90% | 272 | 1024 |
| 24 hrs | 5 | | 700 | | | 215 | 648 |
| 24 hrs | 20 | | 260 | | | 146 | 314 |
| 24 hrs | 50 | | 210 | | | 125 | 213 |
| 1 wk | 2.5 | 1232 | 1072 | 82% | 82% | 84% | 1168 |
| 1 wk | 5 | 744 | 712 | | | | 760 |
| 1 wk | 20 | 336 | 330 | | | | 374 |
| 1 wk | 50 | 221 | 223 | | | | 278 |

| Time | RPM | G | H | J | K | L |
|------|-----|---|---|---|---|---|
| 1 hr | 2.5 | 744 | 748 | 512 | 528 | 496 |
| 1 hr | 5 | 518 | 510 | 392 | 368 | 352 |
| 1 hr | 20 | 263 | 272 | 190 | 200 | 190 |
| 1 hr | 50 | 178 | 186 | 145 | 141 | 138 |
| 24 hr | 2.5 | 944 | 960 | 720 | 896 | 720 |
| 24 hr | 5 | 696 | 656 | 696 | 656 | 720 |
| 24 hr | 20 | 326 | 312 | 316 | 312 | 336 |
| 24 hr | 50 | 218 | 210 | 214 | 213 | 226 |
| 1 wk | 2.5 | 1296 | 1168 | 1184 | 1232 | 1488 |
| 1 wk | 5 | 848 | 792 | | | |
| 1 wk | 20 | 406 | 380 | 396 | 402 | 438 |
| 1 wk | 50 | 262 | 253 | | | |

EXAMPLE 3

Thixotropic polyester compositions are made by the direct add method wherein 2 parts of organoclay as described in Example 1 is added to 200 parts of an unsaturated polyester-styrene solution at 56% polyester solids. Viscosity determinations are made as described in Example 2.

TABLE 3

| Time | RPM | A | B | C | D | E | F |
|------|-----|---|---|---|---|---|---|
| 1 hr | 2.5 | 108 | 120 | 140 | 108 | 88 | 120 |
| 1 hr | 20 | 107 | 107 | 104 | 94 | 84 | 110 |
| 24 hr | 2.5 | 300 | 360 | 260 | 336 | 24% | 73% |
| 24 hr | 20 | 174 | 193 | 159 | 202 | | |
| 1 wk | | 56% | 91% | 49% | 78% | 24% | 54% |

| Time | RPM | G | H | J | K | L |
|------|-----|---|---|---|---|---|
| 1 hr | 2.5 | 240 | 132 | 192 | 112 | 64 |
| 1 hr | 20 | 134 | 120 | 110 | 90 | 76 |
| 24 hr | 2.5 | 320 | 65% | 672 | 320 | 82% |
| 24 hr | 20 | 166 | | 234 | 180 | |
| 1 wk | | 24% | 54% | 94% | 54% | 99% | 59% |

EXAMPLE 4

Using the procedure described in Example 1, an organophilic clay is made by modifying 100 gms of bentonite with 90 meq. of DBT quat and 1.5 percent phenyltriethoxysilane. This clay is evaluated using the pregel procedure of Example 2. The viscosity results of the thixotropic polyester composition are as follows:

| Time | RPM | 1 hr | 24 hr | 1 wk |
|------|-----|------|-------|------|
| | 2.5 | 2200 | 3040 | 3160 |
| | 5 | 1760 | 2240 | 2360 |
| | 20 | 950 | 1205 | 1275 |

| Time | RPM | 1 hr | 24 hr | 1 wk |
|------|-----|------|-------|------|
|      | 50  | 708  | 906   | 974  |

EXAMPLE 5

To a suitable container are added two thousand parts of an aqueous slurry of Wyoming bentonite at 1.8 percent solids which had previously been centrifuged to remove non-clay impurities. Agitation is begun and heat is applied raising the temperature to 75° C. To the slurry is added an aqueous emulsion of a mixture of dimethyl di(hydrogenated tallow) ammonium chloride (DMD) and dimethylbenzyl hydrogenated tallow ammonium chloride (DBT) in the amount of 47.5 miliequivalents (meqs) of DMD and 47.5 meqs of DBT based on 100 grams of the clay. After mixing for 15 minutes at 75° C., 1 weight percent of phenyltriethoxysilane is added, said weight percent being based on the theoretical weight of the reaction product of the aquaternary ammonium chlorides and the clay. After additional heating and mixing at 75° C., the organophilic clay product is recovered by filtration and is dried at 90° C. for 24 hours. The dried product is ground and screened through a 170 mesh (U.S. Standard Sieve) screen. Hydrogenated castor oil (HC) is blended with the organophilic clay in the amount of 25 weight percent based on the weight of the blend.

An unsaturated polyester-styrene composition is modified with the organophilic clay-hydrogenated castor oil blend in the amount of 1% by weight based on the total weight of the composition. Five grams of the polyester composition are poured on a 3"×5" glass matt and is worked into the matt with a spiral laminating roller until air is removed. The matting is then placed at a 75° angle and is observed for 48 hours. No drain-out is noted. Drain-out of 96% is observed after 24 hrs. with a polyester composition modified with fumed silica.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed is:

1. An organophilic clay dry powder comprising the reaction product of
   (a) a smectite type clay having a cation exchange capacity of at least about 75 milliequivalents per 100 grams of clay on a 100 percent active basis;
   (b) a quaternary ammonium compound having the structure

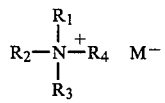

wherein $R_1$ is an alkyl group having about 12 to about 22 carbon atoms, wherein $R_2$, $R_3$ and $R_4$ are alkyl groups containing 1 to about 22 carbon atoms, aryl groups and arylalkyl groups containing 7 to about 22 carbon atoms and wherein M is chloride, bromide, iodide, nitrate, nitrite, sulfate, hydroxide or $C_1$ to $C_{18}$ carboxylate; and
   (c) an organosilane having the formula:

wherein n is an integer of 1 to 3, wherein R is an organic radical having a carbon atom directly linked to the silicon atom and wherein X is alkoxy, acryloxy, amino or halogen.

2. The composition of claim 1 wherein the quaternary ammonium compound is present in the amount of about 50 to about 150 meqs per 100 grams of clay, 100 percent active basis, and wherein the organosilane is present in the amount of about 0.5 to about 5 weight percent based on the theoretical weight of the reaction product of the clay and the quaternary ammonium compound.

3. The composition of claim 2 wherein the quaternary ammonium compound is present in the amount of about 80 to about 130 meqs and the organosilane is present in the amount of about 1 to about 2.5 weight percent.

4. The composition of claim 1 wherein $R_1$ and $R_2$ of the quaternary compound contain 12 to 22 carbon atoms and $R_3$ and $R_4$ are methyl.

5. The composition of claim 1 wherein $R_1$ contains 12 to 22 carbon atoms, $R_2$ is aryl or aryl alkyl and $R_3$ and $R_4$ are methyl.

6. The composition of claim 1 wherein the quaternary ammonium compound is dimethyl di(hydrogenated tallow) ammonium chloride.

7. The composition of claim 1 wherein the quaternary ammonium compound is dimethylbenzyl hydrogenated tallow ammonium chloride.

8. The composition of claim 1 wherein the quaternary ammonium compound is a mixture of dimethyl di(hydrogenated tallow) ammonium chloride and dimethylbenzyl hydrogenated tallow ammonium chloride.

9. The composition of claim 8 wherein the mixture contains equal equivalent amounts of each quaternary ammonium compound.

10. The composition of claim 1 wherein R of the organosilane is an organic radical containing 1 to about 20 carbon atoms.

11. The composition of claim 10 wherein R is alkyl, aryl, alkaryl, arylalkyl, vinyl, allyl, amino-alkyl, aminoaryl and organic radicals having ether, ester or carboxyl groups.

12. The composition of claim 1 wherein n of the organosilane is 1.

13. The composition of claim 1 wherein the organo silane is phenyltriethoxy silane.

14. The composition of claim 1 which contains up to 25 weight percent, based on the weight of the total composition of hydrogenated castor oil.

* * * * *